United States Patent
Labelle et al.

(10) Patent No.: US 9,157,738 B2
(45) Date of Patent: Oct. 13, 2015

(54) APPARATUS FOR CONTAINMENT OF A DEVICE EQUIPPED WITH AN INCLINOMETER

(71) Applicants: Hubert Labelle, Laval (CA); Jean-Marc Mac-Thiong, Montreal (CA); Stefan Parent, Saint-Lambert (CA); Mark Driscoll, Notre-Dame-de-l'Ile-Perrot (CA)

(72) Inventors: Hubert Labelle, Laval (CA); Jean-Marc Mac-Thiong, Montreal (CA); Stefan Parent, Saint-Lambert (CA); Mark Driscoll, Notre-Dame-de-l'Ile-Perrot (CA)

( * ) Notice: Subject to any disclaimer, the term of this patent is extended or adjusted under 35 U.S.C. 154(b) by 159 days.

(21) Appl. No.: 13/836,608

(22) Filed: Mar. 15, 2013

(65) Prior Publication Data
US 2014/0007437 A1    Jan. 9, 2014

Related U.S. Application Data

(60) Provisional application No. 61/615,420, filed on Mar. 26, 2012.

(51) Int. Cl.
*G01C 9/02*   (2006.01)
*G01C 9/10*   (2006.01)
*G01C 9/28*   (2006.01)

(52) U.S. Cl.
CPC .. *G01C 9/02* (2013.01); *G01C 9/10* (2013.01); *G01C 9/28* (2013.01)

(58) Field of Classification Search
CPC .......... A61B 5/107; A61B 5/103; G01B 3/02; G01B 5/24; G01B 5/255; G01C 9/28; G01C 9/18; G01C 9/02; G01C 9/00; G01C 9/10
USPC ............................ 33/365, 370, 371, 301, 347
See application file for complete search history.

(56) References Cited

U.S. PATENT DOCUMENTS

| | | | |
|---|---|---|---|
| 2,342,672 A | | 7/1943 | Bierman et al. |
| 2,570,430 A | * | 10/1951 | Cramer ........................... 33/342 |
| 3,025,064 A | * | 3/1962 | Flood ............................. 473/211 |
| 4,036,213 A | | 7/1977 | Gregory |
| 4,444,204 A | * | 4/1984 | Bryant et al. ................. 600/594 |
| 4,600,012 A | | 7/1986 | Kohayakawa et al. |
| 4,664,130 A | | 5/1987 | Gracovetsky |
| 4,760,851 A | | 8/1988 | Fraser et al. |
| 5,063,679 A | * | 11/1991 | Schwandt ....................... 33/347 |
| 5,181,525 A | | 1/1993 | Bunnell |
| 5,471,995 A | | 12/1995 | Halliday |
| 5,505,001 A | * | 4/1996 | Schaver, Jr. .................... 33/371 |
| 5,560,116 A | * | 10/1996 | Tobia .............................. 33/365 |
| 5,813,125 A | * | 9/1998 | Byrn ............................... 33/451 |
| 5,832,422 A | * | 11/1998 | Wiedenhoefer ........ A61B 5/107 33/1 D |
| 6,500,131 B2 | | 12/2002 | Leitner et al. |
| 6,507,988 B1 | * | 1/2003 | Riviere ........................... 33/371 |
| 6,877,240 B2 | * | 4/2005 | Tranas ............................ 33/391 |
| 6,918,187 B2 | * | 7/2005 | Schaefer ......................... 33/365 |
| 7,555,842 B1 | * | 7/2009 | Asay ............................... 33/373 |
| 7,802,372 B1 | * | 9/2010 | Silberberg ...................... 33/451 |
| 8,646,186 B2 | * | 2/2014 | Lettkeman et al. ............. 33/371 |
| 2004/0221463 A1 | * | 11/2004 | Hexamer, Jr. .................. 33/365 |
| 2005/0016007 A1 | * | 1/2005 | Schaefer ......................... 33/365 |
| 2005/0020942 A1 | | 1/2005 | Wada et al. |
| 2005/0148839 A1 | | 7/2005 | Shechtman et al. |

(Continued)

*Primary Examiner* — Yaritza Guadalupe-McCall

(57) ABSTRACT

An apparatus enabling inclination measurements or irregular surfaces comprising a retaining end adapted to temporarily hold a device equipped with an inclinometer and a supporting end, fixed to the retaining end, conformed to abut an irregular surface whereby the apparatus enables the device equipped with an inclinometer to measure inclination of an irregular surface.

13 Claims, 5 Drawing Sheets

(56) References Cited

U.S. PATENT DOCUMENTS

| | | |
|---|---|---|
| 2007/0149899 A1 | 6/2007 | Shechtman et al. |
| 2012/0151785 A1* | 6/2012 | Lettkeman et al. ............. 33/301 |
| 2014/0007437 A1* | 1/2014 | Labelle et al. .................. 33/301 |
| 2015/0150487 A1* | 6/2015 | Bigolin ................ A61B 5/1072 |
| | | 702/154 |

* cited by examiner

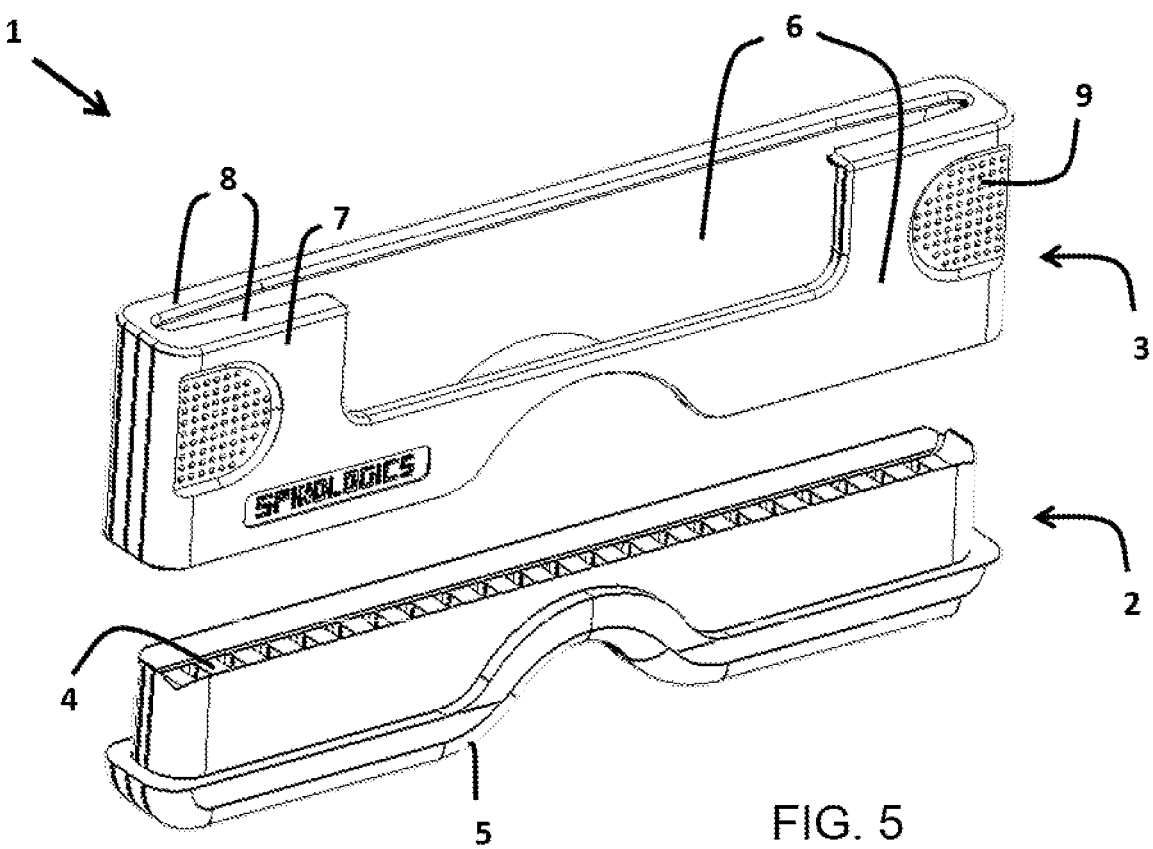
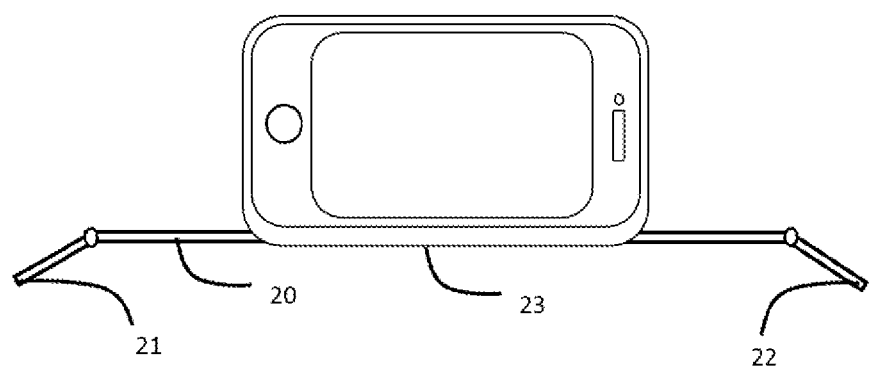
FIG. 6

APPARATUS FOR CONTAINMENT OF A DEVICE EQUIPPED WITH AN INCLINOMETER

PRIORITY STATEMENT UNDER 35 U.S.C. §.119 (E) & 37 C.F.R. §.1.78

This non-provisional patent application claims priority based upon the prior U.S. provisional patent applications entitled "Apparatus for containment of a device equipped with an inclinometer", application No. 61/615,420 filed Mar. 26, 2012 in the names of Hubert LABELLE, Jean-Marc MAC-THIONG, Stefan PARENT and Mark DRISCOLL.

TECHNICAL FIELD OF THE INVENTION

The present invention relates to an apparatus adapted to retain and hold a device equipped with an inclinometer and provide a support shaped to conform to a person's irregular body topology during a clinical or home based assessment.

BACKGROUND OF THE INVENTION

Scoliosis is a deformity of the spine which can appear anytime during life. If a scoliotic deformity reaches dangerous magnitudes or is progressing, a surgical intervention can be proposed to prevent progression and/or correct the deformity. Alternatively, bracing treatments, which attempt to reduce or arrest any additional scoliotic progression, are commonly used in skeletally immature patients with moderate scoliosis. Otherwise, a patient with a mild curvature may simply be monitored to observe if any progression occurs. Over the last decade, a number of new less invasive surgical interventions have been proposed that seek to stop scoliotic progression without the need for fusion. However, such early surgical interventions are only justified if important curvature progression is anticipated. An important variable governing the incremental treatment platform of scoliosis is the progressive history of the spinal curvature. Thus, early detection methods that serve to identify scoliotic curves may greatly assist clinical prognosis and, consequently, improve treatment avenues. Such early detection methods will particularly help in reducing the number of patients presenting to a health professional for the first time with large curves for which a more aggressive treatment is required, considering that early detection of the scoliosis at a milder stage could have been treated with a less invasive treatment.

The present invention provides at least a partial solution to the identified problem.

SUMMARY OF THE INVENTION

The present invention aims at providing a device and method. In use, the device of the present invention provides, among others, the exemplary advantage of enabling the measure of inclination of an irregular surface such as a patient's angle of truck rotation, for example. The present invention may further provide at least some of the following exemplary advantages, e.g., a device that is easier and simpler to use, more compatible and accessible to potential users thereof, and more effective in accomplishing the intended use.

A first aspect of the present invention is directed to an apparatus to be used as a means to enable a device equipped with an inclinometer to measure inclination of an irregular surface such as that found on a mammalian body, for example. The apparatus comprises a retaining end adapted to temporarily hold the device equipped with an inclinometer and a supporting end, fixed to the retaining end, conformed to abut an irregular surface.

Optionally, the supporting end of the apparatus may also be shaped to conform to at least one protrusion arising from the irregular surface of which a measure of inclination is sought. Optionally, the supporting end may have an opposing upper and lower surface whereby the upper surface defines a substantially flat surface and the lower surface has a profile, relatively orthogonal to its surface, defining an arcuate like shape. It is to be understood that the profile may take the shape of any relevant form such as but not limited to a triangle, curved surface, substantially orthogonal in its form or being oblique. The purpose of the lower surface is to provide a means to align the upper surface, having the device equipped with an inclinometer thereon, in a manner that allows for a measure of inclination to be derived from an irregular surface. Thus, any such configuration, shape, or profile of the lower surface of the supporting end is contemplated.

Optionally, the upper surface of the supporting end may be shaped to resist movement of the device equipped with an inclinometer thereon. As an example, preferably this may be achieved by introducing a chamfer along the length of the upper surface of the supporting end. The chamfer providing a resistance to movement. In addition, the chamfer, or any relevant adaptation of the upper surface, may also serve to avoid the influence on the measure of inclination any buttons or protrusions arising from the device equipped with an inclinometer.

In a further option of the present invention, the retaining end comprises a retention edge extending therefrom. The retention edges serves as a means to temporarily hold the device equipped with an inclinometer. Optionally, this retention edge may form a perimeter in which to house or temporarily hold the device equipped with an inclinometer. Advantageously, the retention edge having formed a perimeter would include an opening formed therethrough in order to provide a functional or operational field of view of the device equipped with an inclinometer. In a further option, the retention edge may include a flange being configured to resist movement of the device equipped with an inclinometer. It is to be understood that any modifications to the retention end that would improve the temporary holding performance of the device equipped with an inclinometer is contemplated herein.

Optionally, the retaining end may be adapted to individually and temporarily hold various devices equipped with inclinometers having different dimension or having a protective case thereover.

In yet a further option of the present invention, at least on portion of the apparatus, either one or both of the retaining or supporting ends, may be made of a substantially flexible material. The at least one portion of flexible material may have a Durometer enabling a certain movement of one part of the apparatus in relation to another without jeopardizing the immediate or long term structural integrity of the apparatus. Advantageously, the Durometer would be between 70 and 90. Also, the apparatus may be formed at least substantially from a lightweight and inexpensive material. Furthermore, the apparatus may be formed from a substantially transparent or non-transparent material.

Optionally, the present invention may have a geometric shape in which the thickness is approximately maintained the same throughout in order to facilitate the manufacturing process thereof. A further option comprises the apparatus or any part of the apparatus being formed of a plurality of subdivisions that may be securely adjoined together whereby facilitating the manufacturing process thereof. Preferably, the retaining end and the supporting end may be formed or molded separately and then securely adjoined together to complete the apparatus.

In yet another option, the apparatus may include indents adapted to be grasped.

Another aspect of the present invention is directed to an apparatus to be used as a means to enable a device equipped with an inclinometer to measure inclination of an irregular surface such as that found on a mammalian body, for example. The apparatus comprises an opposing upper and lower surface, where the upper surface defines a substantially flat surface and the lower surface is conformed to abut an irregular surface.

Optionally, the upper surface of the apparatus may be shaped to resist movement of the device equipped with an inclinometer.

A further aspect of the invention comprises a shaft having first and second ends and the shaft longitudinally extending between said ends. A supporting section may be located along the shaft whereby the supporting section is configured to support a device equipped with an inclinometer. The shaft may be shaped in a manner that distances the supporting section from the first and second ends. The distance provided between the supporting section and the first and seconds ends may enable the device equipped with an inclinometer to measure inclination of an irregular surface.

A further aspect of the invention is directed to a method to measure inclination of an irregular surface comprising an apparatus defining a retaining end and a supporting end, attached to the retaining end, wherein the supporting end is conformed to abut an irregular surface.

A further aspect of the invention is directed to a method to measure inclination of an irregular surface comprising providing an apparatus having an opposing upper and lower surface, the upper surface defining a substantially flat surface, the lower surface being conformed to abut an irregular surface such as that of a mammalian body, for example.

A further aspect of the invention is directed to a method to measure inclination of an irregular surface. The method comprising (a) having a patient bend forward and exposing the location of maximum trunk rotation measured from a horizontal gaze from behind and towards the front of the patient, (b) providing a device equipped with an inclinometer, (c) providing an apparatus adapted to temporarily hold the device equipped with an inclinometer and provide a supporting end conformed to abut an irregular surface, (d) engaging the device equipped with an inclinometer with the apparatus, and (e) placing the supporting end over the location of maximum trunk rotation, whereby the angle of trunk rotation is read from the device equipped with an inclinometer and the lower surface of the supporting end is conformed to abut the patient's back and protruding spinal column in a manner not to influence the inclination measure.

Optionally, the method may comprise repeating steps in any order allowing the inclination or angle of maximum trunk rotation to be acquired.

Numerous further advantages attend this present invention.

BRIEF DESCRIPTION OF THE DRAWINGS

These objects, advantages, and features of the present invention will become readily apparent upon reading the following non-restrictive drawings and descriptions of specific embodiments thereof, given the way of example only with reference to the accompanying drawings:

FIG. 5 is an exploded isometric view of the present invention of FIG. 1;

FIG. 6 is another embodiment of the present invention;

DETAILED DESCRIPTION OF THE INVENTION

Figure 1:
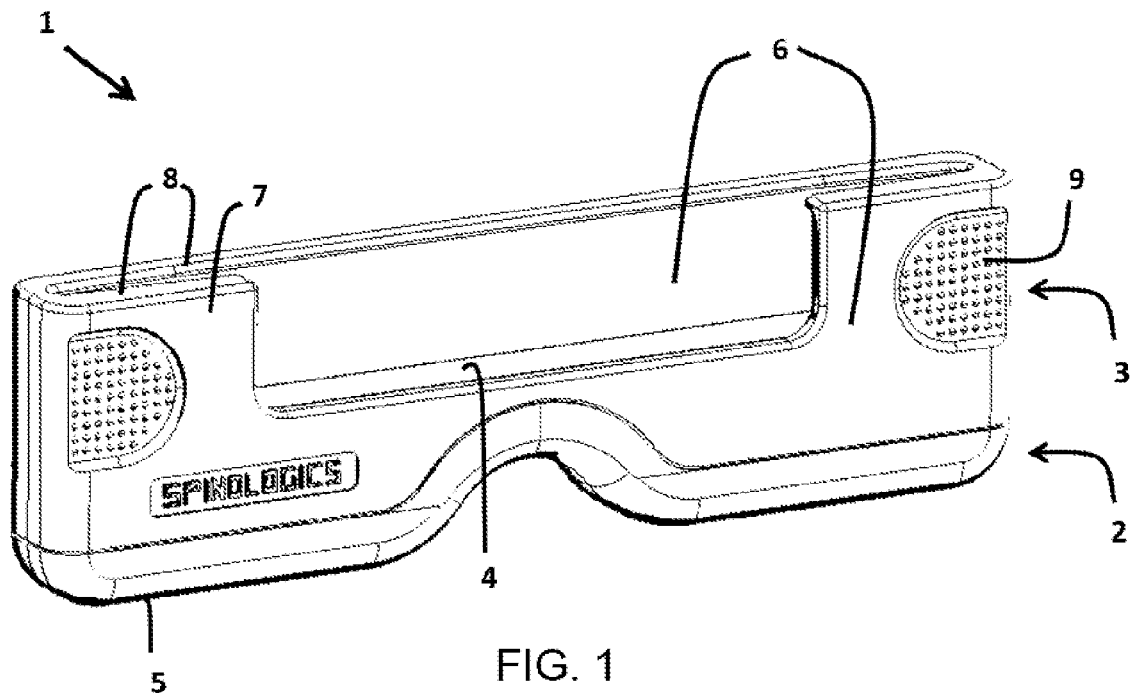
FIG. 1 is an isometric view of an embodiment of the present invention.
Figure 2:
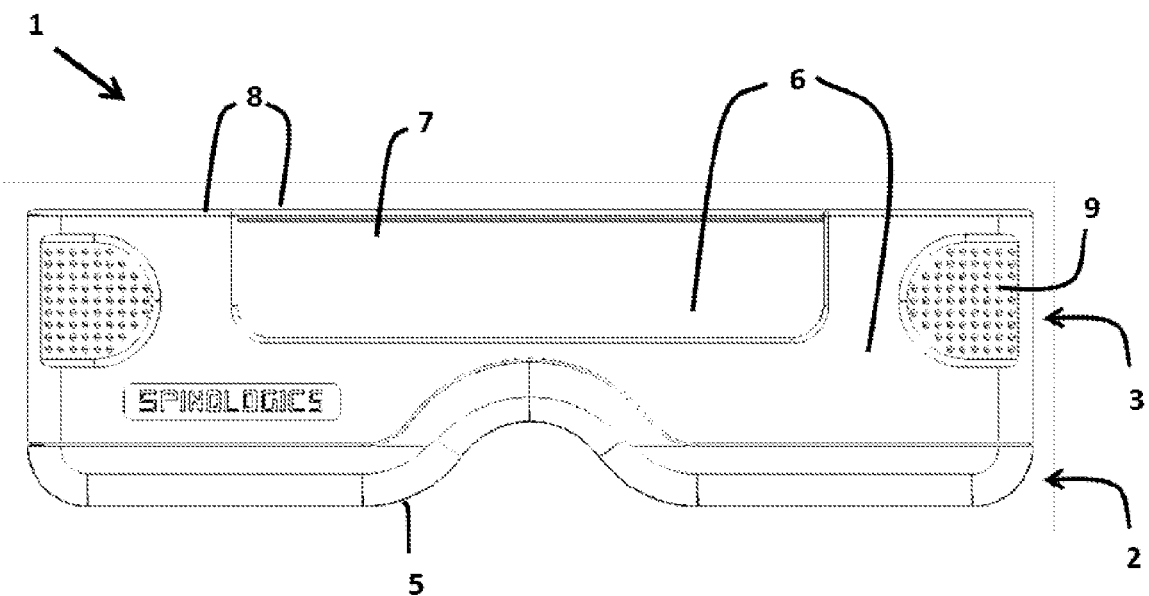
FIG. 2 is a front view of the present invention of FIG. 1.
Figure 3:
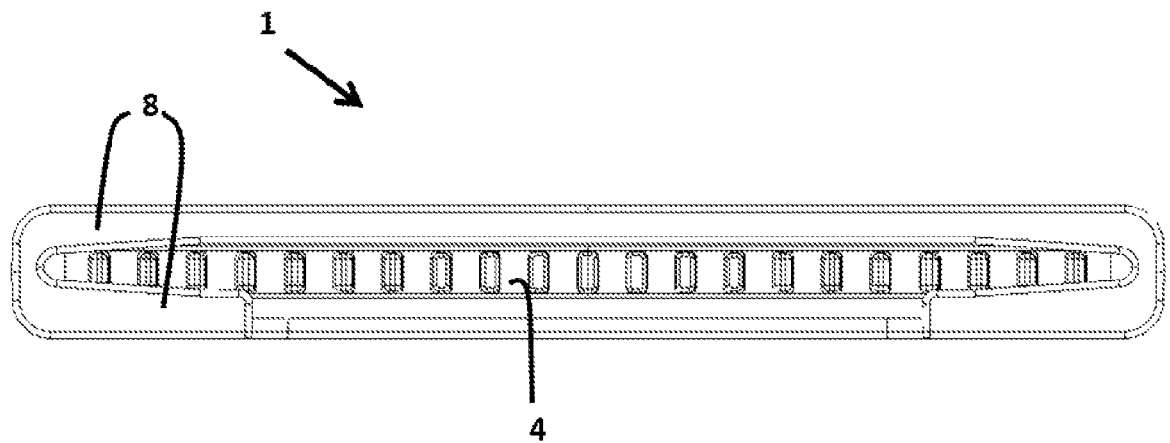
FIG. 3 is a top view of the present invention of FIG. 1.
Figure 4:
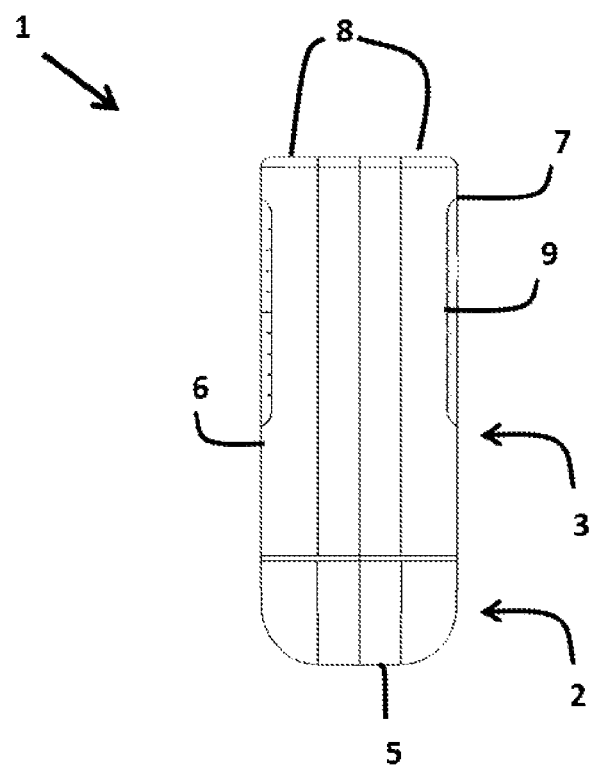
FIG. 4 is a top view of the present invention of FIG. 1.

The present invention relates to an apparatus adapted to retain and hold a device equipped with an inclinometer and provide a support shaped to conform to a person's irregular body topology during a clinical or home based assessment.

The exact incidence of scoliosis measured during the screening of school children depends on the inclusion criteria and can range from 1 to 16 percent. However, the widespread accepted incidence lies around 4 percent and includes curvatures greater than 10 degrees.

Currently a Scoliometer, which behaves as an inclinometer using a fluid filled cavity and a ball indicator, is most often used during the screening of spinal curvature. This implies that the patient under consideration bends forward while exposing the location of maximum deformity. The examiner likely assumes a horizontal eye gaze across the patients back in flexion and the most obtrusive point is sought. The inclinometer is preferably placed perpendicularly to the spinal column and the inclination measurement is recorded. Based on guidelines from screening studies, this process leads to clinician referrals in the event that the inclinometer reads a magnitude of about greater than or equal to 5 degrees of trunk rotation which is closely correlated to 20 degrees of curvature (Cobb angle). However, new studies are emerging that suggests this referral cut-off point be move to about 6 or 7 degrees.

Recent technological advancements allow for accurate inclinometers to be integrated into intelligent devices such as cellular phones, tablets, watches, computers, and the like. This makes them an attractive, simple, and inexpensive alternative to using a Scoliometer for the screening spinal deformities. The large majority of clinicians and health institution do not carry a designated inclinometer, such as the Scoliometer, to diagnose scoliotic spines. However, most have in their possession a device equipped with an inclinometer such as a cellular phone simple or an analogue or digital level/inclinometer, for example. Despite this, the irregular topology of ones back, provided by protrusions for example, make it difficult to accurately position a device equipped with an inclinometer over the patient in order to acquire an accurate reading of the trunk rotation angle, for example.

A parallel problem exists when a clinician is presented with hard or soft copies of patient radiographs. There is an inconsistency and incompatibility in software platforms that allow for angular measures to be extracted from soft copies of clinical images. Moreover, hard copies pose a difficulty for clinicians to reliably assess deformities. Using the inclinometer from an intelligent device may offer a solution to this problem. However, in agreement with complications arising during screening scoliotic patients, the appeal of using a device equipped with an inclinometer as a means to easily and quickly acquired clinical angles of measure is skewed by the questionable accuracy of aligning the device with the element of interest.

It is therefore appreciated that a need exists for an apparatus to accurately align a device equipped with an inclinometer with an element of interest. To provides at least a partial solution to the identified problem, an apparatus could include an end adapted to receive and temporarily hold an inclinometer and have another end shaped to conform to an irregular surface, such as a protrusion, from a living body in a position of interest, such as, for example, posterior spinal protrusions of a patient's back during flexion.

Clearly, no prior art exists that describe the applicants' present invention. Although inclinometers for the assessment of scoliosis are available, a widespread lack of adoption of such implies the clinical needs for simpler, readily available, inexpensive, and more user-friendly methods remain unmet. The present invention provides a novel apparatus for the containment of a device equipped with an inclinometer and adapted to border the protrusions or cavities of a living body, such as, for example, posterior protrusion of one's back in order to accurately acquire angular measures of spinal deformity.

The embodiments of the present invention attempt to in part reduce the difficulties and disadvantages of the aforesaid designs and treatments.

Exemplary embodiments will be described to demonstrate the use, principles, and function of the present invention disclosed herein. These descriptions and illustrations are non-limiting exemplary embodiments and no limitation to the scope of the present invention is thereby intended. Any alteration or modification to the apparatus or alternative application of the present invention principles are contemplated to normally occur by those with ordinary skill in the art to which the present invention relates.

The embodiments may be described as a multiple of distinct operations to facilitate comprehension of the present invention; however, it is to be appreciated that no such order dependence is inferred.

In accordance with one embodiment of the present invention an apparatus having a retaining end and a supporting end allows a device equipped with an inclinometer to measure inclination of an irregular surface. The supporting end may have apposing upper and lower surfaces. The lower surface of the supporting end being shaped to conform to an irregular surface thus allowing for the device equipped with an inclinometer to acquire inclination without having such a measurement offset or interfered with by the irregularities of the surface under consideration. The shape of the supporting end may provide any profile suitable and conforming to an irregular surface of which a measure of inclination is sought. The supporting end also serves as a means to support the device equipped with an inclinometer. In order to effectively do so, the upper surface of the supporting end may provide a surface that is substantially flat. Furthermore, the upper surface may be shaped to resist movement of the device equipped with an inclinometer. By having the upper surface of the supporting end resist movement it improves the holding efficacy used to temporarily retain the device equipped with an inclinometer. Preferably, the shape of the upper surface may be that of a chamfered formed longitudinally thereon.

Furthermore, the retaining end of the apparatus may define a retention edge extending away from the supporting end. The retention edge may serves as a means to temporarily hold and resist movement the device equipped with an inclinometer in relation to the apparatus. This may be achieved in many different manners which are contemplated herein. Preferably, the retention edge of the retaining end forms a perimeter in which the device equipped with an inclinometer is temporarily held. Further, the perimeter may have an opening formed therethrough thus allowing for a functional or operational field of view of the device equipped with an inclinometer. Advantageously, the retention edge may have a flange extending therefrom whereby the flange further resists movement of the device equipped with an inclinometer and favourably allows for various sizes of devices equipped with an inclinometers to be individually used with the present invention. Preferably, the flanged may be shaped along the retention edge in a manner that created a chamfered profile. Optionally, a view plane may be formed through the apparatus in order to allow one to freely align the device equipped with an inclinometer which is being temporally held to an aspect of a clinical image to which an absolute or relative measurement or relative measure is desired.

The material used for the apparatus is preferable to be made at least in part by a material capable of exhibiting flexible properties such as but not limited to a rubber, for example. In order to provide a favorable manufacturing process, the apparatus may have an approximate uniform thickness of its walls so that curing of the molding process helps maintains its relative shape. If required, voids or channels may be introduced into the apparatus in order to maintain the approximate uniform thickness. Further, it may also be favorable that the apparatus be formed in subdivisions and then securely adjoined together. The use of subdivision during the manufacturing process may reduce costs and facilitate production of the present invention.

In accordance with another embodiment of the present invention an apparatus is provided that allows a device equipped with an inclinometer to measure inclination of an irregular surface. The apparatus having opposing upper and lower surfaces, the upper surface defining a substantially flat surface and the lower surface being conformed to abut an irregular surface to which a measure of inclination is sought. Preferably the upper surface may be shaped to resist, in part, movement of the device equipped with an inclinometer.

In accordance with yet another embodiment of the present invention an apparatus is provided that allows a device equipped with an inclinometer to measure inclination of an irregular surface. The apparatus comprising a shaft like configuration having a supporting section on which to temporarily hold or support a device equipped with an inclinometer. The shaft being shaped as to distance the supporting section for its two extremities or from a first and second end. The shaft providing a means to enable the device equipped with an inclinometer to acquire an inclination measure of an irregular surface. The shaft may include moveable joints and may extend from the supporting section. The supporting section may consist of an outer shell which houses and protects the device equipped with an inclinometer such as a phone case, for example. Thus, conveniently, the shaft may extend from such a phone case and have the moveable joints provide the distance from the supporting section, or phone case in this example, and the irregular surface for which an inclination measure is sought.

Reference is now made concurrently to the drawings, in which FIGS. 1, 2, 3 and 4 the apparatus 1 for temporary containment of a device equipped with an inclinometer is demonstrated having a supporting end 2 connected to a retaining end 3. The apparatus 1, globally, is represented as being substantially rectangular in shape. The supporting end 2 having an opposing upper surface 4 and lower surface 5 whereby the upper surface 4 is substantially flat while the profile of the lower surface 5 is exemplified as being relatively arcuate in shape. The retaining end is exemplified as having a retention edge 6 having an upper portion 7 with a flange extending 8 therefrom. The retaining end 3 is sized to receive a device equipped with an inclinometer and is also shown to include an indent 9 formed therein and adapted to be grasped. The retention edge 6 is exemplified as having an opening formed therethrough thus providing a functional field of view towards the device equipped with an inclinometer. In order to improve the retention of the device equipped with an inclinometer and help limit movement between the apparatus and the device equipped with an inclinometer various modifications may be made. For example, the flange 8 may be chamfered towards the outside of the apparatus 1 thus extending further from the retention edge 6. As a further example, the upper surface 4 of the supporting end 2 may be chamfered along its length. Furthermore, such means of limiting movement may enable the apparatus 1 to temporarily hold a device equipped with an inclinometer of various sizes.

Referring to FIG. 5, an exploded view of the apparatus 1 is exemplifies in which the supporting end 2 and the receiving end 3 are shown not yet securely adjoined together. Making use of subdivisions in the manufacturing process with preferably simplify the process. Furthermore, the supporting end 2 is shown having a plurality of recesses formed therein, which serve to maintain an approximate uniform thickness of the device. Once produced, as shown, the supporting end 2 and the receiving end 3 may be then securely adjoined together by any means know by one skilled in the art such as a glue or an ultrasonic weld, for example.

Referring to FIG. 6, another embodiment of the present invention is exemplified. A shaft 20, longitudinally extending between first 21 and second 22 ends, has a supporting section 23 which is configured to support a device equipped with an inclinometer, even if fitted with a protective case, or the like. The shaft 20 may be malleable or shaped with ease or even fitted along its length with a means of altering its shape, such as a pivoting joint for example. The shaft 20 is or may be shaped in manner that distances the supporting section 23 away from the first 21 and second 22 ends as to elevate the device equipped with an inclinometer away from the irregular surface and enable it to effectively measure the angle of inclination, such as, for example, the protrusion representing the spinal column in a patient bending forwards.

Figure 7:
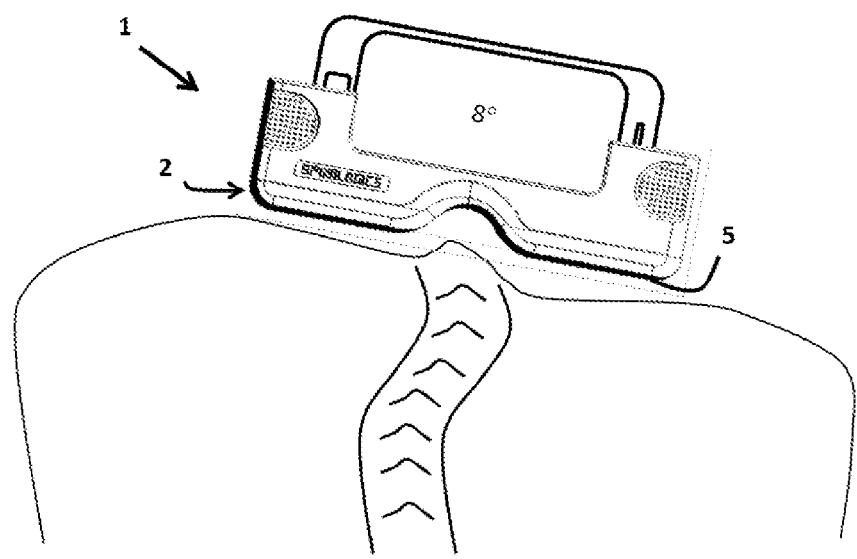
FIG. 7, is example of an embodiment of the present invention where the apparatus contains a device equipped with an inclinometer and is positioned over a patient's back during flexion.

Referring to FIG. 7, the apparatus 1 is exemplified as being placed across a patient's back during flexion. Truck rotation is acquired by placing the apparatus 1 temporarily holding a device equipped with an inclinometer across the most obtrusive point or the area maximum rib hump. In this configuration, the containment device's arcuate profile of the lower surface 5 of the supporting end 2 conforms to the protrusions provided by the patient's spinous processes. That is, the lower surface 3 sufficiently conforms to abut the patient's back, or shape provided by the ribcage, without being interfered with by the spinal protrusion. Thus, the apparatus 1 enables the device equipped with an inclinometer to acquire a measure of inclination or the angle of trunk rotation.

Figure 8:
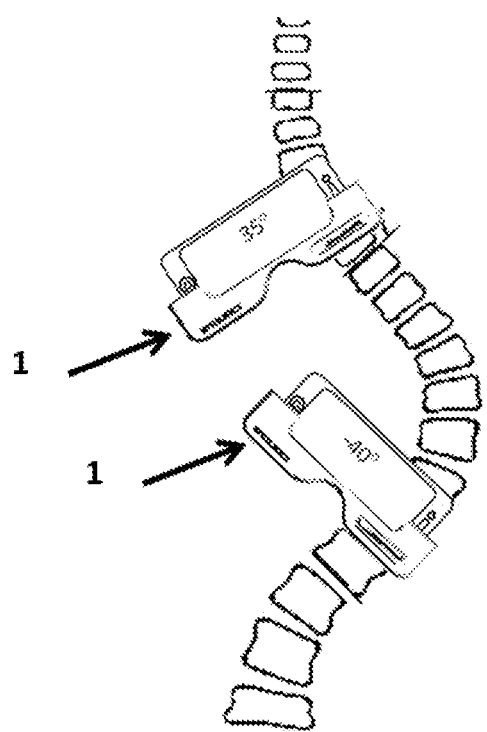
FIG. 8 is an example of an embodiment of the present invention where the apparatus contains a device equipped with an inclinometer and is positioned over clinical images to acquire angles of interest.

Referring to FIG. 8, the apparatus 1 comprises an aperture formed therethough whereby providing a view plane with which a user may freely acquire an angular measure of a clinical image. The aperture may provide a view plane which may be used to align the apparatus 1, containing a device equipped with an inclinometer, to something of interest from which an angular measure is desired such as a clinical image, for example. Alternative manners in which the apparatus 1 could provide a means to align a device equipped with an inclinometer exist and are contemplated. For example, the body may contain an identifier such as a line formed within a partially transparent material. As an example, this embodiment may be utilised when assessing a scoliotic curvature, two angles may be taken and then used to calculate the Cobb angle.

Figure 9:
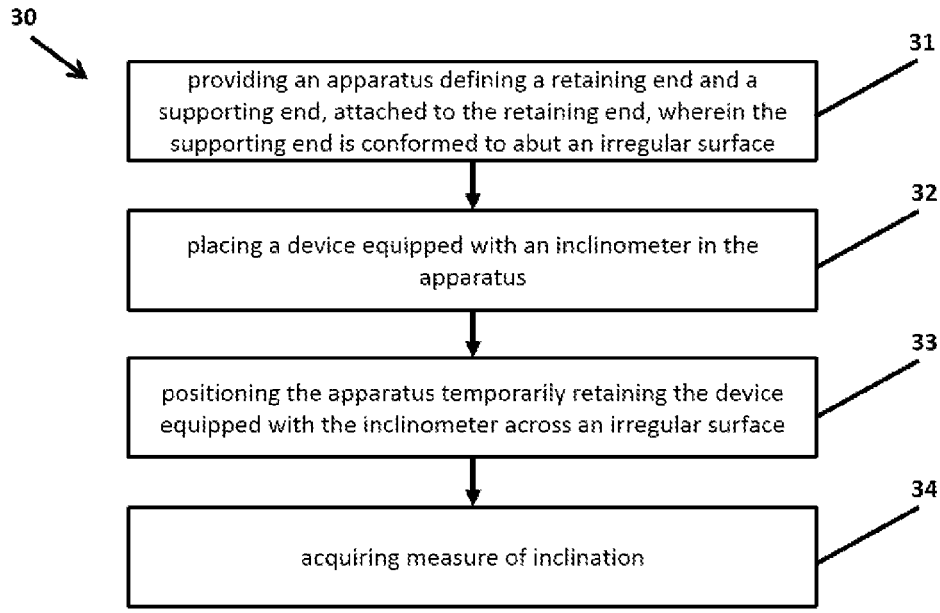
FIG. 9 is a flow chart of an exemplary method of use of the apparatus in accordance with the teachings of the present invention.
Figure 10:
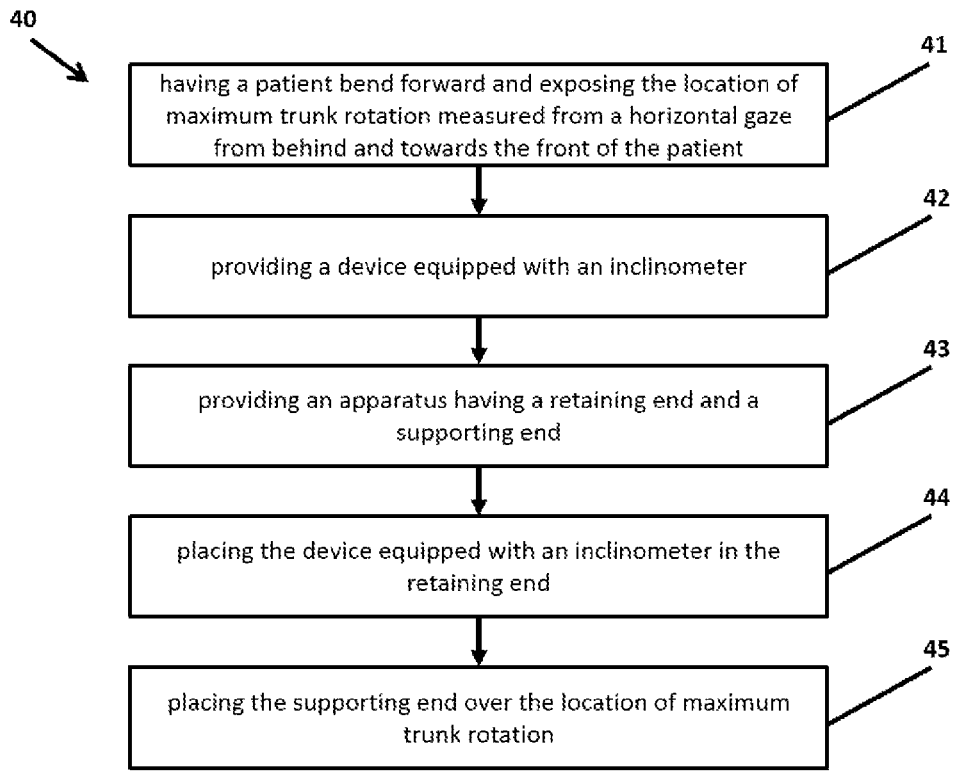
FIG. 10 is another flow chart of an exemplary method of use of the apparatus in accordance with the teachings of the present invention.

Referring to FIG. 9, the method to measure inclination of an irregular surface comprising 30 comprises: providing an apparatus defining a retaining end and a supporting end, attached to the retaining end, wherein the supporting end is conformed to abut an irregular surface 31, placing a device equipped with an inclinometer in the apparatus 32, positioning the apparatus temporarily retaining the device equipped with the inclinometer across an irregular surface 33, and acquiring measure of inclination 34.

Referring to FIG. 9, in the most common expected use of the present invention the method for measuring the angle of trunk rotation of a patient 40 comprises: having a patient bend forward and exposing the location of maximum trunk rotation measured from a horizontal gaze from behind and towards the front of the patient 41, providing a device equipped with an inclinometer 42, providing an apparatus having a retaining end and a supporting end 43, placing the device equipped with an inclinometer in the retaining end 44, and placing the supporting end over the location of maximum trunk rotation 45.

In the course of the above described embodiments, a number of alternatives have been identified and others may well occur to those skilled in the art without departing from the field of the present invention. Thus, various combinations, sub-combinations, and sundry adaptations are maintained under the principles of the present invention.

In the course of the above described embodiments, a number of alternatives have been identified and others may well occur to those skilled in the art without departing from the field of the invention. Thus, various combinations, sub-combinations, and sundry adaptations are maintained under the principles of the provided invention.

A method is generally conceived to be a self-consistent sequence of steps leading to a desired result. Skilled persons will readily understand how the steps of the exemplary methods described herein could be rearranged without affecting the desired result. Exemplary embodiments have been described to demonstrate the use, principles, and function of the invention disclosed herein. These descriptions and illustrations are non-limiting exemplary embodiments and no limitation to the scope of the invention is thereby intended. Any alteration or modification to the device or alternative application of the invention principles are contemplated to normally occur by those with ordinary skill in the art to which the invention relates. Likewise, the description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

The invention claimed is:

1. An apparatus enabling inclination measurements of irregular surfaces comprising:

a) a retaining end at least partially made of a substantially flexible material adapted to temporarily hold a device equipped with an inclinometer of different dimensions; and b) a supporting end, fixed to the retaining end, conformed to abut an irregular surface, wherein the supporting end has an upper and lower surface; the upper surface defining a substantially flat surface and relatively parallel to an at least one flat portion of the lower surface from which a measure of inclination is sought and the lower surface having an arcuate profile formed therethrough and positioned between a first and second flat portion whereby the apparatus enables the device equipped with an inclinometer to measure inclination of an irregular surface having a protrusion while moving the apparatus along the protrusion therein the arcuate profile of the lower surface.

2. The apparatus as recited in claim 1, wherein the upper surface is shaped to resist movement of the device equipped with an inclinometer.

3. The apparatus as recited in claim 1, wherein the retaining end comprises a retention edge extending away from the supporting end.

4. The apparatus as recited in claim 3, wherein the retention edge forms a perimeter having an opening formed therethrough; whereby the opening provides a functional field of view of the device equipped with an inclinometer.

5. The apparatus as recited in claim 3, wherein the retention edge has an upper portion comprising a flange extending therefrom, wherein the flange is adapted to frictionally engage the device equipped with an inclinometer.

6. The apparatus as recited in claim 5, wherein the flange is configured to resist movement of the device equipped with an inclinometer.

7. The apparatus as recited in claim 1, wherein the apparatus has an approximately uniform thickness whereby facilitating the manufacturing process of molding of the apparatus.

8. The apparatus as recited in claim 1, wherein the apparatus comprises a plurality of subdivisions securely adjoined together whereby the subdivisions compose the apparatus and facilitate the manufacturing process or storing thereof.

9. The apparatus as recited in claim 1, wherein the apparatus is collapsible whereby enabling to the apparatus fold compactly.

10. The apparatus as recited in claim 1, wherein the apparatus comprises an aperture formed therethough whereby providing a view plane with which a user may freely acquire an angular measure of a clinical image.

11. An apparatus comprising:
a) a shaft having a first end and a second end, the shaft longitudinally extending from the first end towards the second end;

b) a supporting section of the shaft, located between the first and second ends, configured to support a device equipped with an inclinometer; wherein the first and seconds ends of the shaft is shaped shapeable are moveable away from the supporting section in a manner that distances the supporting section from the first and second ends; and whereby, the distance between the supporting section and the first and second ends enable the device equipped with an inclinometer to measure inclination of an irregular surface.

12. A method to measure inclination of an irregular surface comprising:
a. providing an apparatus defining a retaining end at least partially made of a substantially flexible material adapted to temporarily hold a device equipped with an inclinometer of different dimensions; and a supporting end, fixed to the retaining end, conformed to abut an irregular surface, wherein the supporting end has an upper and lower surface; the upper surface defining a substantially flat surface and relatively parallel to an at least one flat portion of the lower surface from which a measure of inclination is sought and the lower surface having an arcuate profile formed therethrough and positioned between a first and second flat portion;

b. positioning the apparatus temporarily retaining the device equipped with the inclinometer across an irregular surface; and c. acquiring measure of inclination.

13. A method for measuring the angle of trunk rotation of a patient comprising:
(a) having a patient bend forward and exposing the location of maximum trunk rotation measured from a horizontal gaze from behind and towards the front of the patient;
(b) providing a device equipped with an inclinometer;
(c) providing an apparatus having a retaining end and a supporting end;
(d) placing the device equipped with an inclinometer in the retaining end; and
(e) placing the supporting end over the location of maximum trunk rotation;

whereby the angle of trunk rotation is read from the device equipped with an inclinometer and the lower surface of the supporting end is conformed to abut the patient's back and protruding spinal column in a manner not to influence the inclination measure.

* * * * *